(No Model.)
A. L. TEETOR.
CLUTCH FOR INTESTINE MACHINES.
No. 366,799. Patented July 19, 1887.
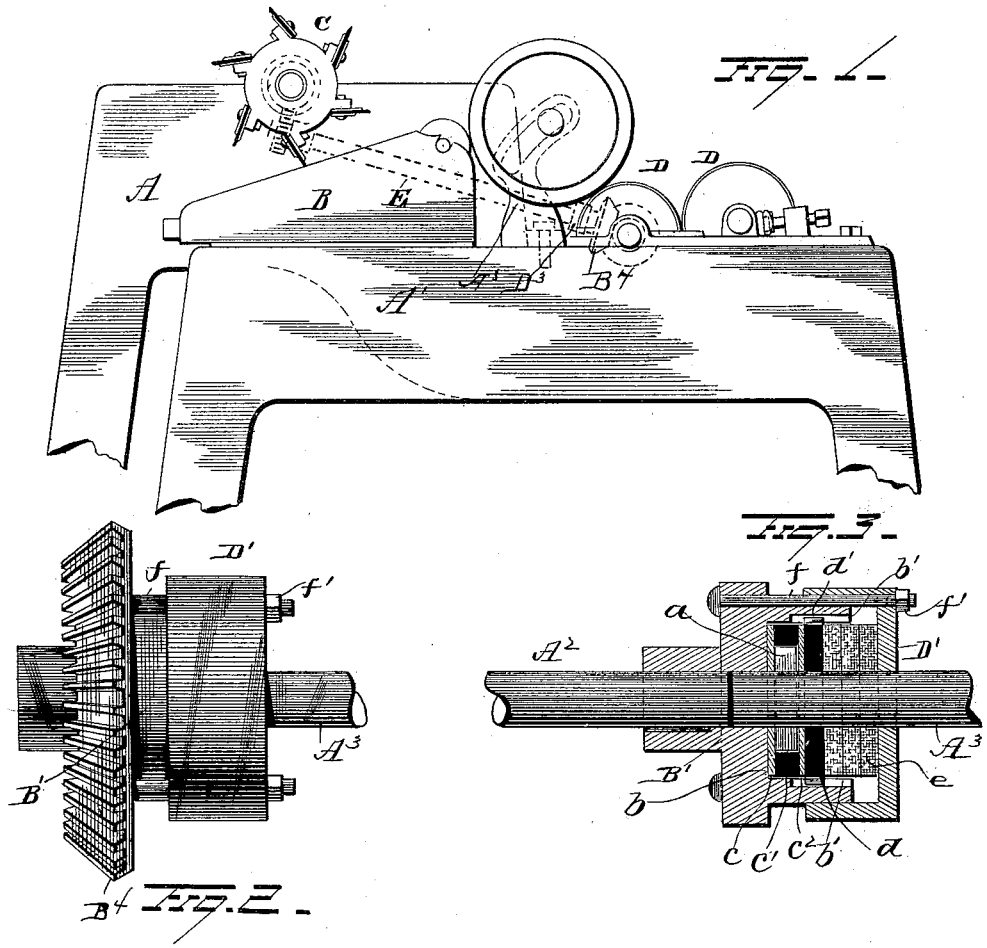
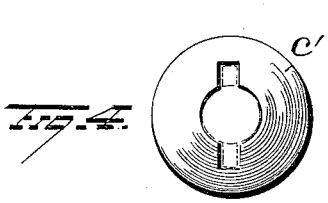
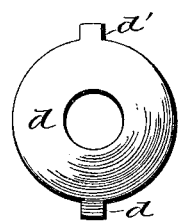
Witnesses
R. Nottingham
G. F. Downing
Inventor
Abe L. Teetor
By his Attorney
H. A. Seymour

UNITED STATES PATENT OFFICE.

ABE L. TEETOR, OF INDIANAPOLIS, INDIANA, ASSIGNOR TO JAMES CUNNING, OF SAME PLACE.

CLUTCH FOR INTESTINE-MACHINES.

SPECIFICATION forming part of Letters Patent No. 366,799, dated July 19, 1887.

Application filed February 15, 1887. Serial No. 227,680. (No model.)

*To all whom it may concern:*

Be it known that I, ABE L. TEETOR, of Indianapolis, in the county of Marion and State of Indiana, have invented certain new and useful Improvements in Clutch Devices for Intestine-Cleaning Machines; and I do hereby declare the following to be a full, clear, and exact description of the invention, such as will enable others skilled in the art to which it appertains to make and use the same.

My invention relates to improvements in clutch devices for intestine-cleaning machines. Its object is to provide a safety attachment for such machines, consisting of a clutch or shaft coupling, which may be adjusted to resist a certain strain, and to "give," to prevent breakage, when the strain by accident or otherwise becomes excessive.

A further object is to provide a friction-clutch whose wearing-surfaces will not corrode by reason of moisture or dirt which may get into it, and also in which simplicity of construction and operation are prominent features.

Hitherto in machines of this class the operator has been in danger of injury by getting his hand or clothing caught between the gripping-rollers while handling and guiding the intestine. My invention is designed to remove this danger. The device is usually located between the shaft of one of the gripping-rollers and its driving-gear; and it consists in combining with the gripping-rollers and the driving mechanism of an intestine-machine a cup, disk, or flange secured to the end of a shaft or to a gear-wheel, and a similar cup or cap perforated to admit the coupled shaft and adapted to be pressed against frictional and spring disks in the cup, and adjustably secured thereto by draw-bolts, the end of the coupled shaft being locked inside the cup to one of the disks and caused to rotate therewith.

The invention also consists in detailed combinations, which will be pointed out in the claims.

In the accompanying drawings, Figure 1 represents a side elevation of an intestine-machine, showing in dotted lines the location of my improved safety device; Fig. 2, an elevation of the clutch when arranged to connect the shaft and gear; Fig. 3, a central section of clutch when arranged to connect two shaft-sections; Fig. 4, a face view of the locking-disk; Fig. 5, a face view of the pressure-disk.

A and A' represent the frame of an intestine-machine; B, the table; C, the scraping roller or cylinder; D D, the gripping-rollers, which draw the intestine over the table and under the scraping-roller. The gripping-rollers derive their motion from the scraping-roller through shaft E.

$A^2$ and $A^3$ represent the sections of the shafts at the coupling. Keyed or otherwise secured to section $A^2$ is the cup-shaped collar B', the inner face, $b$, of which is milled to form a flat bearing-surface. The inner surface of the sides of this cup is provided with two grooves, $b'$, for a purpose hereinafter mentioned.

The cup is adapted to receive a series of perforated disks, as follows: A thin disk, $c$, preferably of zinc or other non-corroding metal, is placed against the bottom of the cup, and next a thick disk, $c'$, preferably of a different metal from $c$. This disk, besides having the central perforation, is centrally slotted, as shown in Fig. 4. Next to this disk is placed another thin disk, $c^2$, similar to the first one. These three disks are adapted to engage and turn with the cup B' when the pressure is sufficient to cause the necessary friction. A pressure-disk, $d$, is next inserted. This disk is provided with lugs or ears $d'$, (shown in Fig. 5,) which are adapted to fit in the interior grooves, $b'$, of the cup and lock the disk and prevent its turning with the others. Finally, a cushion or spring, preferably consisting of rubber disks $e$, is inserted. When the disks are all in place, a perforated cap or plate, D', is brought down against them and secured to the cup or plate B' by bolts $f$. These bolts are screw-threaded and provided with nuts $f'$, by means of which any required pressure may be brought against the disks. It is now seen that the disks, caps, and plates will all rotate with the shaft $A^2$; and in order to cause the rotation of shaft $A^3$ it is necessary to connect it with one of these parts. To do this, the end of the shaft $A^3$ is provided with a cross-head, $a$, which is adapted to fit into the central slot and perforation in the disk $c'$. If sufficient pressure to overcome the load on the shaft $A^3$ is now put on the disks, all the parts will move together; but if a resistance on the shaft $A^3$ greater than the friction is offered, the disk $c'$, and consequently the shaft $A^3$, will cease to rotate, while the others continue their motion.

This clutch has been found very useful in machines where sudden stoppages of parts of the mechanism happen by accident or uneven work, preventing breakage and often serious accidents to workmen.

In Fig. 1, at $D^3$, and in Fig. 2 I have shown the clutch connected with a bevel-pinion for yieldingly securing the latter to a shaft, $A^3$. In this construction the cup-shaped collar $B'$ is rigid with the pinion $B^4$, and the latter is connected to the cap-plate $D'$ by the bolts $f$. By this arrangement of parts, when the resistance offered is greater than the friction, one portion of the clutch will continue to revolve and the other portion remain at rest.

I make no claim to the peculiar construction of cleaning-machine shown and herein referred to, as the same forms no part of the present invention.

Having described my invention, what I claim as new, and desire to secure by Letters Patent, is—

1. A frictional clutch or coupling for shafts, consisting of a cup or plate rigidly secured to the end of one section of the shaft and a series of disks held under pressure within the cup or plate, one of said disks being adapted to lock with the end of the other section of the shaft, substantially as set forth.

2. The combination, with the fixed cup or plate, the adjustable cap or cover, and friction-disks located therein, of two shaft-sections, the end of one shaft-section being rigidly secured to the cup or plate and the end of the other shaft-section locked to one of the disks, substantially as described.

3. The combination, with the fixed cup-plate and a cap or cover, of the disk $c'$, provided with a slot, a spring, $e$, pressure-plates D and $B'$, and the shaft-sections $A^2$ and $A^3$, the section $A^3$ being provided with a cross-head to fit and lock with the disk $c'$, as set forth.

4. The combination, with a shaft, the cup-plate, and the cap or cover adjustably secured on the cup or plate, of the spring-disks $e$ and the pressure-disk $d$, connected with the end of the shaft, and the disks $c$, $c'$, and $c^2$, movable with respect to the spring-disks and connected with the end of the shaft, as described.

5. A non-corroding friction-clutch for shafts, consisting of a cup or plate rigidly connected with one section of the shaft, a series of disks composed of different non-corroding metals and connected with the other section of the shaft, a spring for furnishing pressure to produce the necessary friction, and a cap or cover adjustably secured to the cup or plate, substantially as described.

6. The combination, with a shaft-section carrying a cup-plate, a second shaft-section carrying a friction-disk, and a cap-plate adjustably secured to the cup-plate, of springs for yielding and holding the friction-disk into contact with the cup-plate, substantially as set forth.

In testimony whereof I have signed this specification in the presence of two subscribing witnesses.

ABE L. TEETOR.

Witnesses:
HARRY L. TAYLOR,
HOWARD L. KREIDER.